US012562408B2

(12) United States Patent

Huang

(10) Patent No.: US 12,562,408 B2

(45) Date of Patent: Feb. 24, 2026

(54) INTELLIGENT-IDENTIFICATION QUICK-CHARGE ELECTRIC BLANKET

(71) Applicant: Wanglai Huang, Beijing (CN)

(72) Inventor: Wanglai Huang, Dongguan (CN)

(73) Assignee: Wanglai Huang, Beijing (CN)

( * ) Notice: Subject to any disclaimer, the term of this patent is extended or adjusted under 35 U.S.C. 154(b) by 1003 days.

(21) Appl. No.: 17/706,605

(22) Filed: Mar. 29, 2022

(65) Prior Publication Data

US 2023/0170540 A1 Jun. 1, 2023

(30) Foreign Application Priority Data

Nov. 26, 2021 (CN) .......................... 202111422229.0

(51) Int. Cl.
| | |
|---|---|
| *H01M 10/44* | (2006.01) |
| *G06F 13/38* | (2006.01) |
| *H05B 1/02* | (2006.01) |
| *H05B 3/34* | (2006.01) |

(52) U.S. Cl.
CPC .......... *H01M 10/44* (2013.01); *G06F 13/385* (2013.01); *H05B 1/0272* (2013.01); *H05B 3/342* (2013.01)

(58) Field of Classification Search
CPC ................................. H05B 3/34; H05B 3/342
See application file for complete search history.

(56) References Cited

U.S. PATENT DOCUMENTS

| | | | | | |
|---|---|---|---|---|---|
| 3,683,151 | A | * | 8/1972 | Mills ...................... | H05B 3/342 |
| | | | | | 219/501 |
| 7,022,950 | B2 | * | 4/2006 | Haas ...................... | A61F 7/007 |
| | | | | | 219/217 |
| 2005/0016982 | A1 | * | 1/2005 | Campf ................. | H05B 1/0272 |
| | | | | | 219/211 |
| 2014/0034628 | A1 | * | 2/2014 | Chen .................... | H05B 1/0272 |
| | | | | | 219/212 |
| 2023/0239969 | A1 | * | 7/2023 | Yang .................... | H05B 1/0272 |
| | | | | | 219/501 |

FOREIGN PATENT DOCUMENTS

CN 111796614 A * 10/2020 ............. G05D 23/24

* cited by examiner

*Primary Examiner* — Ibrahime A Abraham
*Assistant Examiner* — Hamzeh Hicham Amin
(74) *Attorney, Agent, or Firm* — Leong C. Lei

(57) ABSTRACT

An intelligent-identification quick-charge electric blanket includes an electric blanket body, a manual operation button module and a connecting cable for a quick charge power source. The connecting cable includes an input module, a cable body, and an output port. The input module includes an output control circuit, a main control circuit, a power supply circuit, and a USB interface. The electric blanket simplifies the structure of the electric blanket body. It is convenient for subsequent replacement of the quick charge identification function or the electric blanket body, thereby reducing the maintenance cost.

8 Claims, 5 Drawing Sheets

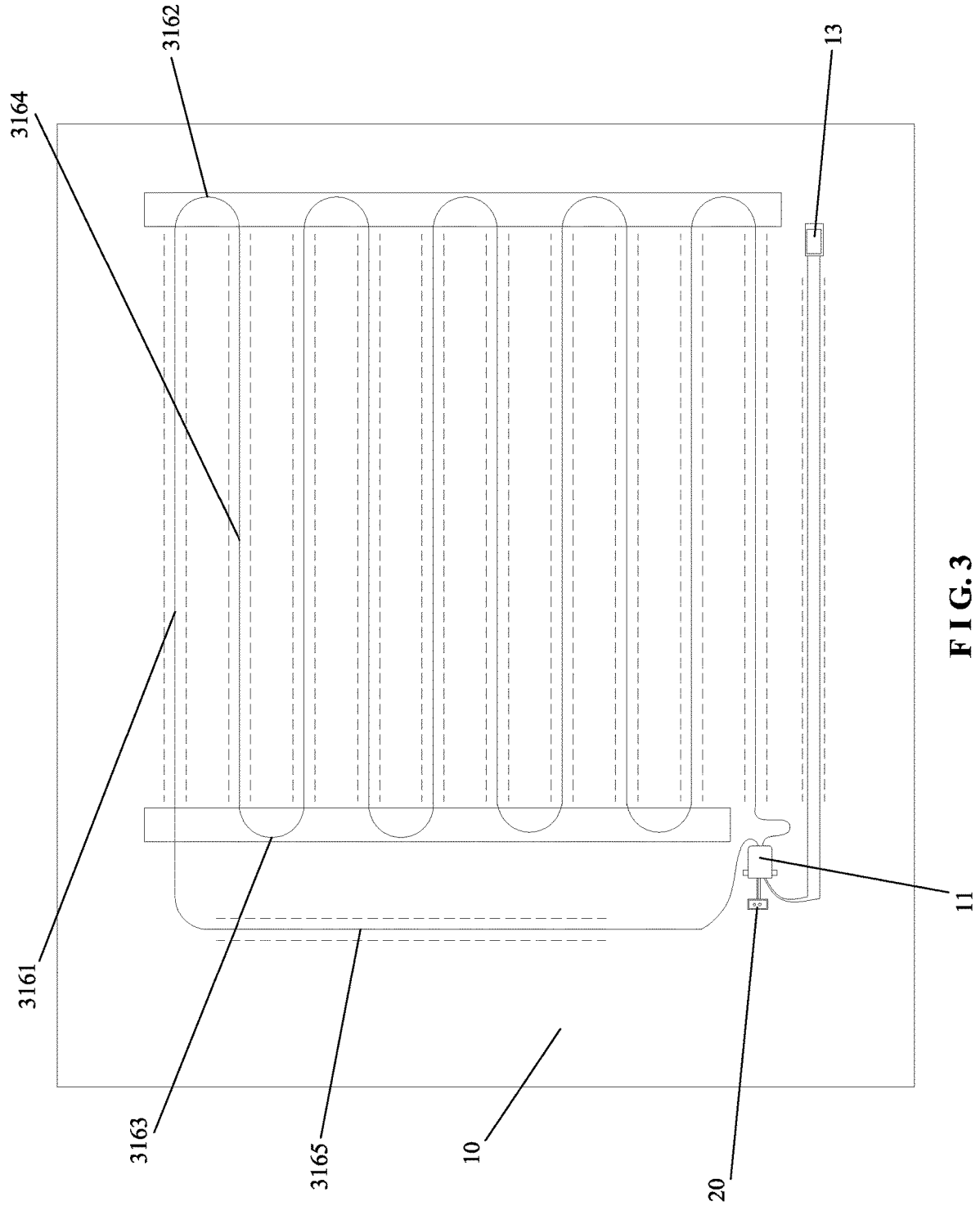
F I G. 3

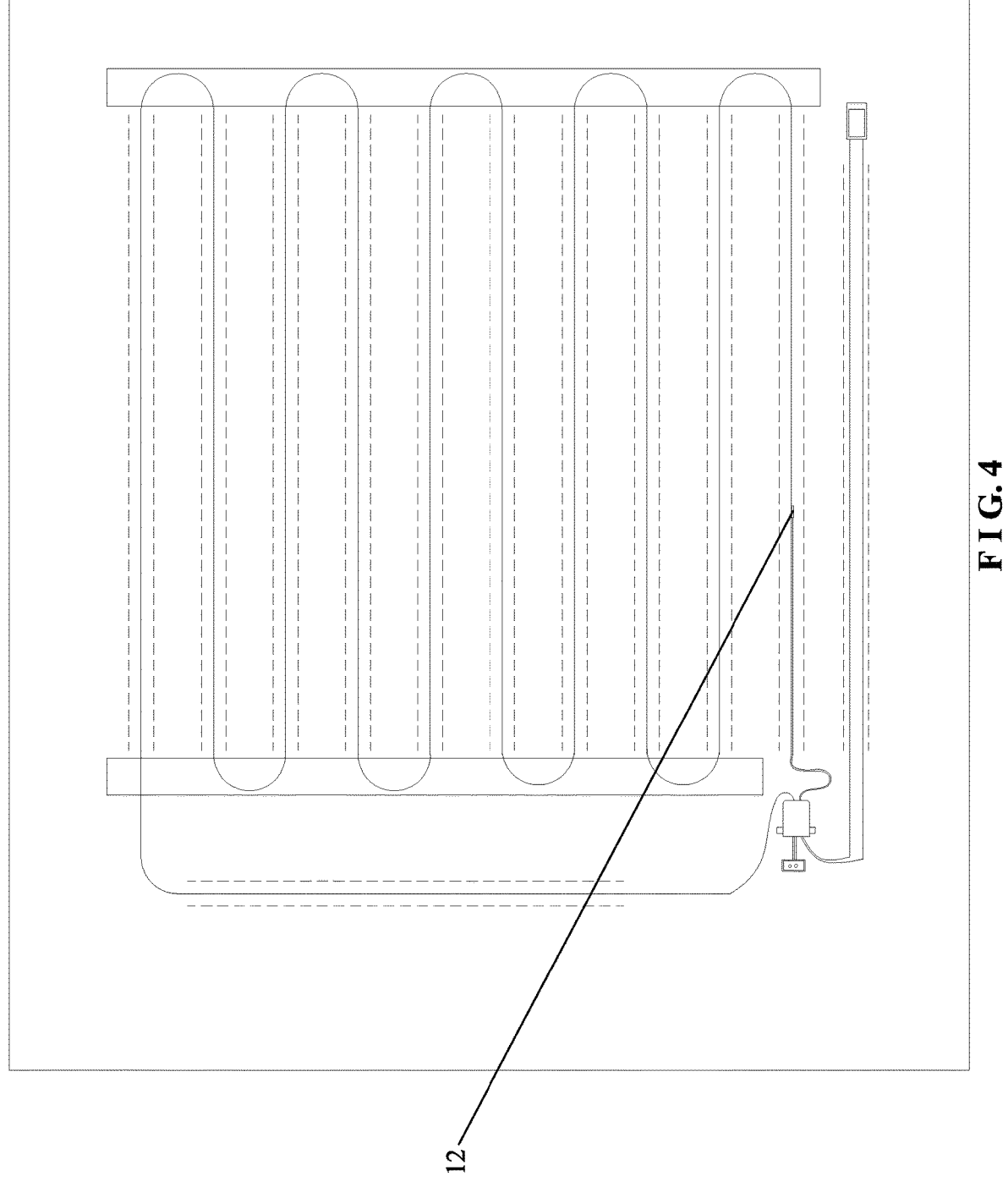
12
F I G. 4

INTELLIGENT-IDENTIFICATION QUICK-CHARGE ELECTRIC BLANKET

BACKGROUND OF THE INVENTION

1. Field of the Invention

The present invention relates to an electric blanket, and more particularly to an intelligent-identification quick-charge electric blanket.

2. Description of the Prior Art

Electric heating products (such as electric heating quilts, electric blankets, hot compresses, etc.) are essential items for winters. It is difficult for a conventional electric blanket to quickly identify a quick charge source in order to charge a heating load more quickly (with a higher DC voltage). Accordingly, electric blankets that can quickly identify a quick charge source are developed on the market. However, the device for quick charge identification is disposed on the electric blanket, which complicates the overall structure of the electric blanket. In addition, once the device for quick charge identification is damaged, it is replaced as a whole, so the maintenance cost is high.

Accordingly, the inventor of the present invention has devoted himself based on his many years of practical experiences to solve these problems.

SUMMARY OF THE INVENTION

In view of the defects of the above-mentioned prior art, the primary object of the present invention is to provide an intelligent-identification quick-charge electric blanket, which simplifies the structure of the electric blanket body. It is convenient for subsequent replacement of the quick charge identification function or the electric blanket body, thereby reducing the maintenance cost.

In order to achieve the above-mentioned object, the present invention adopts the following technical solutions:

An intelligent-identification quick-charge electric blanket comprises an electric blanket body, a manual operation button module, and a connecting cable for a quick charge power source.

The connecting cable includes an input module, a cable body, and an output port. The input module includes an output control circuit, a main control circuit supporting a quick charge (QC) protocol, a power supply circuit for supplying power to the main control circuit, and a USB interface for pairing with the quick charge power source. The main control circuit is connected to the output control circuit.

Both ends of the cable body are connected to the output control circuit and the output port, respectively. The electric blanket body is provided with a heating load and an adapter port that is connected to the output port in a pluggable manner. The manual operation button module is disposed on the electric blanket body. The heating load is connected to the output control circuit through the adapter port and the output port. The manual operation button module is connected to the main control circuit through the adapter port and the output port.

The USB interface has a pin IN+, a pin IN−, and a pin OUT−. The pin IN+ is connected to the power supply circuit. The pin IN− is grounded. The pin OUT− is connected to the output control circuit to quickly charge the heating load in a handshake communication state.

Compared with the prior art, the present invention has obvious advantages and beneficial effects. Specifically, it mainly integrates the main control circuit supporting quick charge (QC) protocol, the USB interface, the power supply circuit and the output control circuit with the input module of the connecting cable, so as to simplify the structure of the electric blanket body. In addition, the pluggable design of the connecting cable and the electric blanket body facilitates the subsequent replacement of the quick charge identification function or the electric blanket body, thereby reducing maintenance costs.

Secondly, by providing the junction box on the electric blanket body, the wiring of the electric blanket body can be arranged in the junction box in an orderly manner, which can effectively avoid the crosstalk caused by the twisting of multiple wires, improve the rate of data transmission, and enhance the reliability and stability of data transmission.

In addition, the overall circuit structure design is ingenious and reasonable, which ensures the stability and reliability of the product in use.

BRIEF DESCRIPTION OF THE DRAWINGS

FIG. 3 is a schematic diagram of the structure of the electric blanket body according to the preferred embodiment of the present invention (showing the heating wires);

FIG. 4 is a schematic diagram of the structure of the electric blanket body according to another embodiment of the present invention (showing the PTC thermistor)

DETAILED DESCRIPTION OF THE PREFERRED EMBODIMENTS

Embodiments of the present invention will now be described, by way of example only, with reference to the accompanying drawings.

Figure 1:
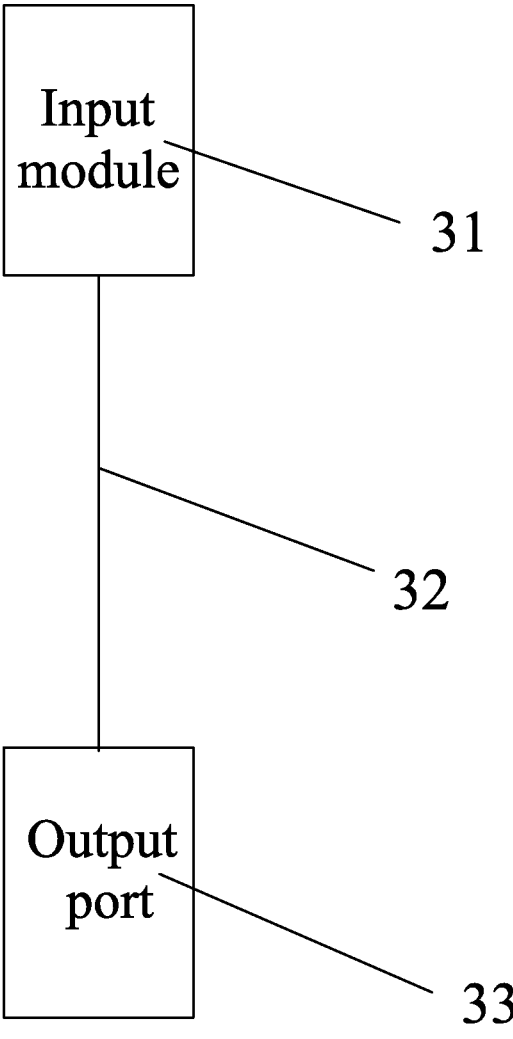
FIG. 1 is a schematic block diagram of the control principle of the connecting cable according to a preferred embodiment of the present invention.
Figure 2:
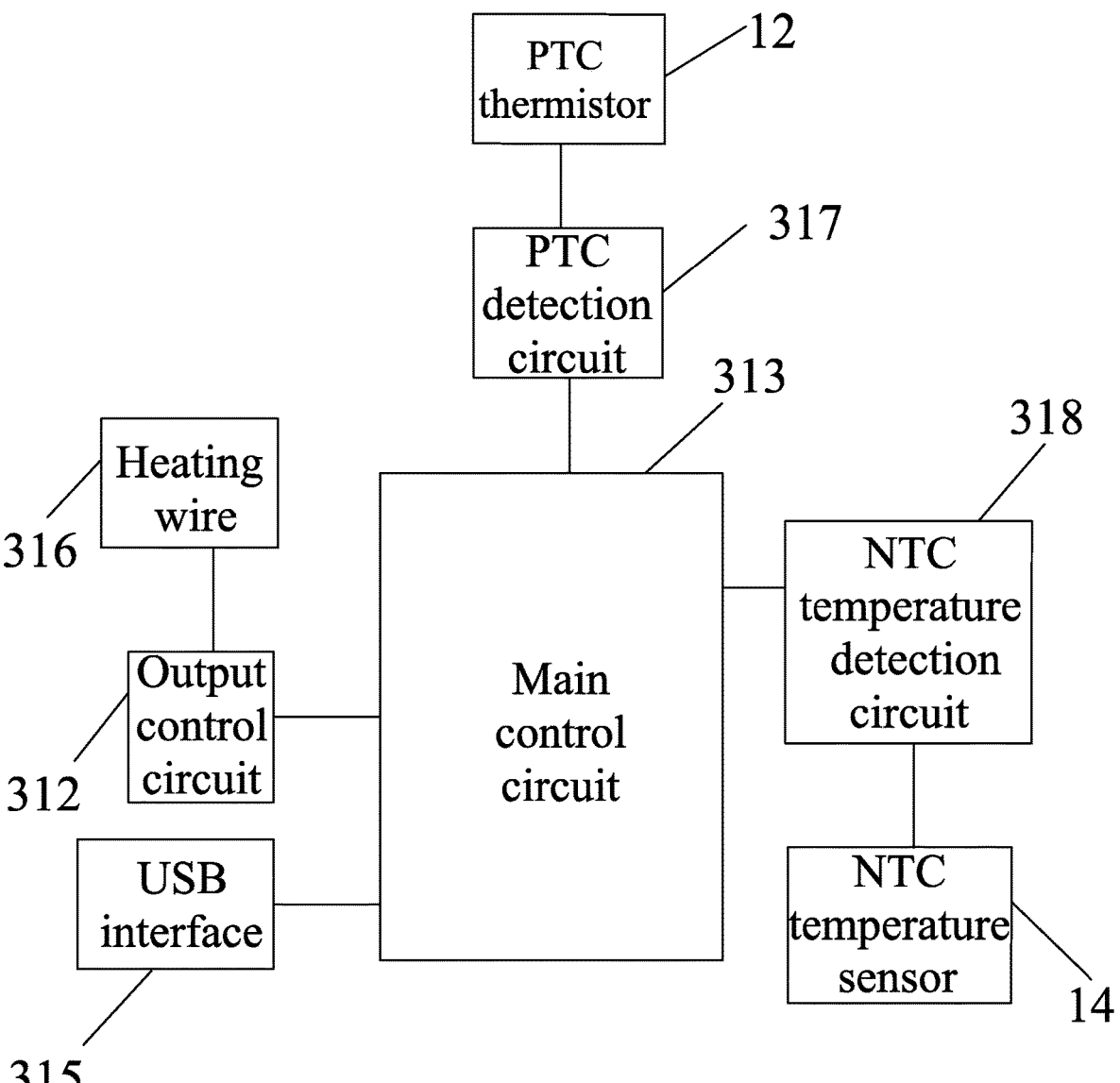
FIG. 2 is a schematic block diagram of the control principle of the input module according to the preferred embodiment of the present invention.
Figure 5:
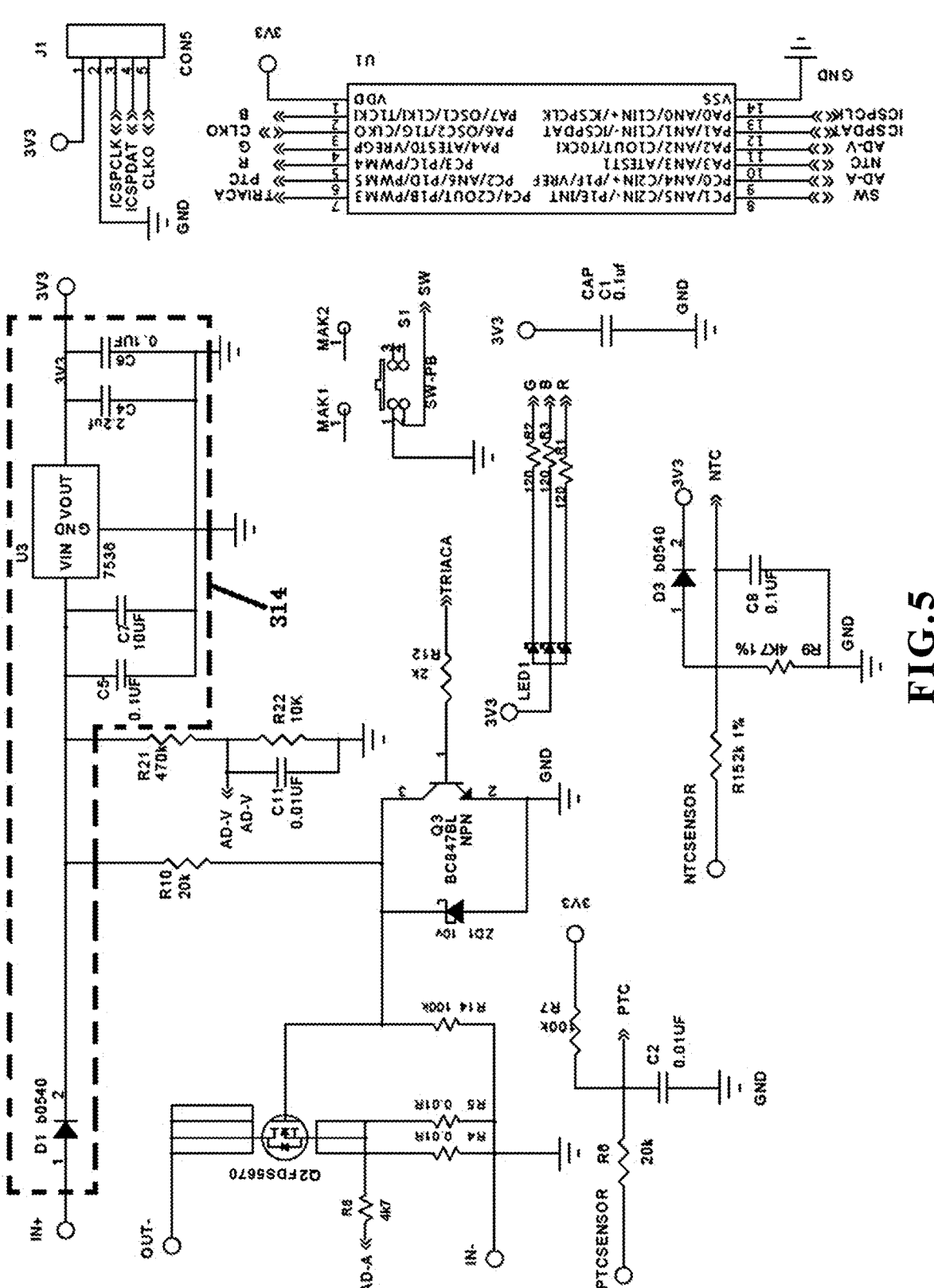
FIG. 5 is a schematic circuit diagram of the input module according to the preferred embodiment of the present invention (wherein the quick charge power source and the heating load are not shown).

As shown in FIG. 1 through FIG. 5, an intelligent-identification quick-charge electric blanket comprises an electric blanket body 10, a manual operation button module 20, and a connecting cable for a quick charge power source.

The connecting cable includes an input module 31, a cable body 32, and an output port 33. The input module 31 includes an output control circuit 312, a main control circuit 313 supporting a quick charge (QC) protocol, a power supply circuit 314 for supplying power to the main control circuit 313, and a USB interface 315 for pairing with the quick charge power source. The main control circuit 313 is connected to the output control circuit 312. In this embodiment, the quick charge power source is a power bank or a charger that supports the quick charge protocol. Of course, the quick charge power source may be other USB quick charge power source, but not limited thereto.

Both ends of the cable body 32 are connected to the output control circuit 312 and the output port 33, respectively. The electric blanket body 10 is provided with a heating load and an adapter port 13 that is connected to the output port 33 in a pluggable manner. The heating load may be a heating wire

316. Of course, the heating load may be other heating loads, but not limited thereto. In this embodiment, the heating load adopts the heating wire 316, and the heating wire 316 is arranged in the electric blanket body 10 in a multi-segment S shape from front to back. Each segment of the S-shaped heating wire 316 includes a first straight segment 3161, a right curved segment 3162, a second straight segment 3164, and a left curved segment 3163. All the first straight segments 3161 on the same side are bonded to the electric blanket body 10 by adhesive. All the second straight segments 3164 on the same side are also bonded to the electric blanket body 10 by adhesive. The left end of the foremost first straight segment 3161 is bent backward and integrally connected to a third straight segment 3165. Both the last second straight segment 3164 and the third straight segment 3165 are connected to a junction box 11 described below. The distance between the adjacent first and second straight segments 3161, 3164 is 80 mm. The length and width of the electric blanket body 10 are 1510 mm and 1360 mm, respectively.

The manual operation button module 20 is disposed on the electric blanket body 10. The heating load is connected to the output control circuit 312 through the adapter port 13 and the output port 33. The manual operation button module 20 is connected to the main control circuit 313 through the adapter port 13 and the output port 33.

The USB interface 315 has a pin IN+, a pin IN−, and a pin OUT−. The pin IN+ is connected to the power supply circuit 314. The pin IN− is grounded. The pin OUT− is connected to the output control circuit 312 to quickly charge the heating load in a handshake communication state.

The electric blanket body 10 is provided with a junction box 11. In another embodiment, the electric blanket body 10 is provided with a PTC thermistor 12 for connecting to the main control circuit 313. Both the manual operation button module 20 and the heating load are connected to the adapter port 13 through the junction box 11. Through the design of the junction box 11, the overall wiring layout is compact, concise and beautiful.

The PTC thermistor 12 is wrapped around the heating load through a high temperature adhesive tape. The input module 31 further includes a PTC detection circuit 317. The PTC detection circuit 317 includes a resistor R6, a capacitor C2, and a resistor R7. Both ends of the resistor R6 are connected to the main control circuit 313 and the PTC thermistor 12, respectively. The other end of the PTC thermistor 12 is grounded. One end of the capacitor C2 is connected to the main control circuit 313, and the other end of the capacitor C2 is grounded. Both ends of the resistor R7 are connected to the power supply circuit 314, respectively.

In this embodiment, the main control circuit 313 includes a main control chip U1. The main control chip U1 has main control pins 1 to 14. The main control pin 6 is grounded through capacitor C2. The main control pin 7 and the main control pin 9 are respectively connected to the output control circuit 312. The main control pin 11 is connected to the power supply circuit 314.

The output control circuit 312 includes a resistor R12, a resistor R14, a resistor R8, a resistor R4, a resistor R5, a MOS transistor Q2, a triode Q3, and a Zener diode ZD1. The main control pin 7 is connected to the base of the triode Q3 through the resistor R12. The collector of the triode Q3 is connected through resistor R10. The emitter of the triode Q3 is grounded. The collector of the triode Q3 is connected to the source of the MOS transistor Q2. The source of the MOS transistor Q2 is grounded through the resistor R14. The gate of the MOS transistor Q2 is grounded through the resistor R4. The gate of the MOS transistor Q2 is connected to the main control pin 9 through the resistor R8. The resistor R5 is connected in parallel with both ends of the resistor R4. The drain of the MOS transistor Q2 is connected to the pin OUT−.

The electric blanket body 10 is provided with an NTC temperature sensor 14. The input module 31 further includes an NTC temperature detection circuit 318. The NTC temperature detection circuit 318 is connected to the NTC temperature sensor 14 and the main control circuit 313. The NTC temperature detection circuit 318 includes a diode D3, a resistor R9, a resistor R15, and a capacitor C8. The cathode of the diode D3 is connected to the power supply circuit 314, and the anode of the diode D3 is grounded through the resistor R9. The capacitor C8 is connected in parallel with both ends the resistor R9. The main control pin 10 is connected to one end of the NTC temperature sensor 14 through the resistor R15. The other end of the NTC temperature sensor 14 is grounded.

The present invention further comprises an overvoltage detection circuit for detecting the voltage between the pin IN+ and the pin IN−. The overvoltage detection circuit includes a resistor R21, a resistor R22, and a capacitor C11. The pin IN+ is connected to the main control pin 11 through the resistor R21. The main control pin 11 is grounded through the resistor R22. Both ends of the resistor R22 are connected in parallel with the capacitor C11.

The power supply circuit 314 includes a three-terminal voltage regulator U3, a capacitor C4, a capacitor C5, a capacitor C6, a capacitor C7, and a diode D1. The three-terminal voltage regulator U3 has voltage regulator pins 1 to 3. The voltage regulator pin 1 is grounded. The pin IN+ is connected to the anode of the diode D1. The cathode of the diode D1 is connected to the voltage regulator pin 2. The voltage regulator pin 2 is connected to the voltage regulator pin 1 through the capacitor C5. The capacitor C7 is connected in parallel with both ends of the capacitor C5. The voltage regulator pin 3 outputs 3.3V DC voltage to the main control pin 1. The voltage regulator pin 3 is connected to the voltage regulator pin 1 through the capacitor C6. The capacitor C4 is connected in parallel with both ends of the capacitor C6.

In this embodiment, the voltage regulator pin 3 is connected to a state indicator circuit for power supply. The state indicator circuit is connected to the main control circuit 313. The state indicator circuit includes an RGB LED light and resistors R1 to R3. The RGB LED light has a first pin, a second pin, a third pin, and a fourth pin. The fourth pin is connected to the main control pin 4 through the resistor R2. The second pin is connected to the main control pin 2 through the resistor R3. The first pin is connected to the main control pin 5 through the resistor R1. The third pin is connected to the voltage regulator pin 3.

What is claimed is:

1. An intelligent-identification quick-charge electric blanket, comprising an electric blanket body, a manual operation button module and a connecting cable for a quick charge power source;

the connecting cable including an input module, a cable body and an output port, the input module including an output control circuit, a main control circuit supporting a quick charge protocol, a power supply circuit for supplying power to the main control circuit and a USB interface for pairing with the quick charge power source, the main control circuit being connected to the output control circuit;

both ends of the cable body being connected to the output control circuit and the output port, respectively; the electric blanket body being provided with a heating load and an adapter port that is connected to the output port in a pluggable manner, the manual operation button module being disposed on the electric blanket body, the heating load being connected to the output control circuit through the adapter port and the output port, the manual operation button module being connected to the main control circuit through the adapter port and the output port;

the USB interface having a pin IN+, a pin IN− and a pin OUT−, the pin IN+ being connected to the power supply circuit, the pin IN-being grounded, the pin OUT− being connected to the output control circuit to quickly charge the heating load in a handshake communication state;

wherein the electric blanket body is provided with a PTC thermistor for connecting to the main control circuit, and the PTC thermistor is wrapped around the heating load through a high temperature adhesive tape; and wherein the input module further includes a PTC detection circuit, the PTC detection circuit includes a resistor R6, a capacitor C2 and a resistor R7, both ends of the resistor R6 are connected to the main control circuit and one end of the PTC thermistor respectively, another end of the PTC thermistor is grounded, one end of the capacitor C2 is connected to the main control circuit, another end of the capacitor C2 is grounded, and both ends of the resistor R7 are connected to the power supply circuit, respectively.

2. The intelligent-identification quick-charge electric blanket as claimed in claim 1, wherein the electric blanket body is provided with a junction box, and the manual operation button module and the heating load are connected to the adapter port through the junction box.

3. The intelligent-identification quick-charge electric blanket as claimed in claim 1, wherein the main control circuit includes a main control chip U1, the main control chip U1 has main control pins 1 to 14;

the main control pin 7 and the main control pin 9 are respectively connected to the output control circuit, the main control pin 11 is connected to the power supply circuit.

4. The intelligent-identification quick-charge electric blanket as claimed in claim 3, wherein the output control circuit includes a resistor R12, a resistor R14, a resistor R8, a resistor R4, a resistor R5, a MOS transistor Q2, a triode Q3 and a Zener diode ZD1;

the main control pin 7 is connected to a base of the triode Q3 through the resistor R12, a collector of the triode Q3 is connected through resistor R10, an emitter of the triode Q3 is grounded, the collector of the triode Q3 is connected to a source of the MOS transistor Q2, the source of the MOS transistor Q2 is grounded through the resistor R14, a gate of the MOS transistor Q2 is grounded through the resistor R4, the gate of the MOS transistor Q2 is connected to the main control pin 9 through the resistor R8, the resistor R5 is connected in parallel with both ends of the resistor R4, and a drain of the MOS transistor Q2 is connected to the pin OUT−.

5. The intelligent-identification quick-charge electric blanket as claimed in claim 3, wherein the electric blanket body is provided with an NTC temperature sensor, the input module further includes an NTC temperature detection circuit, and the NTC temperature detection circuit is connected to the NTC temperature sensor and the main control circuit.

6. The intelligent-identification quick-charge electric blanket as claimed in claim 5, wherein the NTC temperature detection circuit includes a diode D3, a resistor R9, a resistor R15 and a capacitor, a cathode of the diode D3 is connected to the power supply circuit, an anode of the diode D3 is grounded through the resistor R9, the capacitor C8 is connected in parallel with both ends the resistor R9, the main control pin 10 is connected to one end of the NTC temperature sensor through the resistor R15, and another end of the NTC temperature sensor is grounded.

7. The intelligent-identification quick-charge electric blanket as claimed in claim 3, further comprising an overvoltage detection circuit for detecting voltage between the pin IN+ and the pin IN−;

the overvoltage detection circuit including a resistor R21, a resistor R22 and a capacitor C11, the pin IN+ being connected to the main control pin 11 through the resistor R21, the main control pin 11 being grounded through the resistor R22, both ends of the resistor R22 being connected in parallel with the capacitor C11.

8. The intelligent-identification quick-charge electric blanket as claimed in claim 3, wherein the power supply circuit includes a three-terminal voltage regulator U3, a capacitor C4, a capacitor C5, a capacitor C6, a capacitor C7, and a diode D1;

the three-terminal voltage regulator U3 has voltage regulator pins 1 to 3, the voltage regulator pin 1 is grounded, the pin IN+ is connected to an anode of the diode D1, a cathode of the diode D1 is connected to the voltage regulator pin 2, the voltage regulator pin 2 is connected to the voltage regulator pin 1 through the capacitor C5, the capacitor C7 is connected in parallel with both ends of the capacitor C5; the voltage regulator pin 3 outputs 3.3V DC voltage to the main control pin 1, the voltage regulator pin 3 is connected to the voltage regulator pin 1 through the capacitor C6, and the capacitor C4 is connected in parallel with both ends of the capacitor C6.

* * * * *